United States Patent [19]

Hearn

[11] 4,408,238

[45] Oct. 4, 1983

[54] MAGNETIC HEAD ARM ASSEMBLY

[75] Inventor: Anthony R. Hearn, Winchester, England

[73] Assignee: International Business Machines Corporation, Armonk, N.Y.

[21] Appl. No.: 308,218

[22] Filed: Oct. 5, 1981

[30] Foreign Application Priority Data

Mar. 18, 1981 [EP] European Pat. Off. ........ 81301162.4

[51] Int. Cl.³ .................. G11B 5/48; G11B 5/016; G11B 21/16
[52] U.S. Cl. .................. 360/104; 360/99; 360/137
[58] Field of Search ............ 360/104, 105, 106, 107, 360/109, 103, 99, 137; 248/636

[56] References Cited

U.S. PATENT DOCUMENTS

| 4,189,759 | 2/1980 | Bauck | 360/137 |
| 4,208,684 | 6/1980 | Jannsen et al. | 360/104 |
| 4,216,505 | 8/1980 | Grant | 360/104 |
| 4,347,535 | 8/1982 | Dalziel | 360/99 |

OTHER PUBLICATIONS

IBM Technical Disclosure Bulletin, vol. 21, No. 8, Jan. 1979, p. 3093, "Damped Head Aim", R. E. Norwood.
IBM Technical Disclosure Bulletin, vol. 11, No. 3, Aug. 1968, p. 248, "Dangled Slider Mount", Rynders et al.

Primary Examiner—Robert M. Kilgore
Attorney, Agent, or Firm—Nathan N. Kallman

[57] ABSTRACT

A cantilever magnetic head support arm assembly for a disk file comprises a flat beam structure and a means of damping the structure against out-of-plane vibrations. The damping means comprises a rigid sidebar extending along one longitudinal edge of the beam structure and a layer of compliant damping material connecting the beam structure and sidebar together. Relative motion between the beam structure and sidebar causes elastic shear deformation of the damping layer to absorb the energy of vibration.

8 Claims, 5 Drawing Figures

MAGNETIC HEAD ARM ASSEMBLY

DESCRIPTION

Technical Field

This invention relates to a magnetic head arm assembly for supporting transducing heads in disk files.

BACKGROUND OF THE INVENTION

One of the most common forms of information storage apparatus is the magnetic disk file in which information is written on and reproduced from the surface of a rotating storage disk by means of a transducing head. The disk media may be rigid or flexible and storage may be achieved by optical or magnetic means, for example. It is common, particularly in magnetic recording, to support the transducing head very close to the disk medium by means of an air bearing created by the motion of the disk. To access information on different areas of the disk, it is also well known to provide linear or rotary head positioning apparatus to move the heads over the disk surface to different radial positions. The heads are supported over the disk surface by means of support arms mounted on the positioning apparatus in cantilever fashion. The heads are mounted on the support arms by means of compliant suspensions which allow limited motion of the heads to accommodate irregularities in the disk surface or variations in the air bearing.

Vibration or resonance of the support arms can have a deleterious effect on the performance of the information storage apparatus. The introduction of damping to limit vibration in order to prevent the head from striking the disk is discussed in an article entitled "Damped Slider Mount" by R. R. Rynders et al (IBM Technical Disclosure Bulletin, Volume 11, No. 3, August 1968, page 248). A magnetic head, which is fixed rather than movable over a disk, is mounted on the tip of a cantilever support arm which is a sandwich structure of two metal members and a constrained elastomeric damping layer parallel to the disk.

In case of a movable head, it is well known to employ a closed loop servo system to control the positioning apparatus to position the head accurately over a desired concentric track of recorded information on the disk. Vibration of the head support arm can cause the head to move off track and introduce an error signal into the servo system which is modulated at the vibration frequency. Also, the resonant frequency of the head support arm is such as to cause instability of the servo system. Another effect of resonance of a head support arm is the degradation of the signal from the transducing head by modulation of the transduced signal. In the publication entitled "Damped Head Arm" by R. E. Norwood (IBM Technical Disclosure Bulletin, Volume 21, Number 8, January 1979, page 3093), a constrained layer damping technique is described to overcome both these problems. As in the Rynders et al article, the constrained layer is parallel to the plane of the disk and absorbs energy by bending to effect the damping.

Damping of head support arms employed in multiple flexible disk files for similar reasons is described in U.S. Pat. Nos. 4,189,759 (R. C. Bauck et al) and 4,208,684 (D. M. Janssen et al). Both patents show an articulated support arm in which a base portion is hinged to a tip portion by a leaf spring. Up and down motion of the tip portion is damped by a further leaf spring in rubbing contact with friction pads.

Damping has also been employed in different though related areas of disk files such as the head positioning apparatus itself. U.S. Pat. No. 4,144,466 (M. R. Hatch) shows a two part linear actuator for positioning heads radially with respect to the disks. Damping of longitudinal resonances in the actuator is provided by a cylindrical layer of damping material between the two parts through which actuator forces are transmitted in shear. No damping of the head support arms themselves is shown.

SUMMARY OF THE INVENTION

Although the need for effective damping of out-of-plane resonances of head support arms has been recognized in the prior art, the various solutions proposed, that involve friction damping or constrained layer damping in a bending mode, have had a major structural impact on the support arm. Furthermore neither of these methods of damping is as effective as shear damping.

According to the present invention, there is provided a head support arm for a disk file adapted to support a transducing head at one end and adapted at the other end to be mounted on a positioning apparatus in cantilever fashion, the arm comprising a relatively rigid beam structure of flattened cross-section defining a plane therethrough, which structure is susceptible to out-of-plane resonances, and damping means to damp said resonances, characterized in that the damping means comprises a relatively rigid sidebar located alongside one longitudinally extending edge of the beam structure, and a layer of relatively compliant damping material providing a mechanical connection between the sidebar and the beam structure whereby out-of-plane resonances of the beam structure are damped by shear of the damping material as a result of relative motion between the beam and sidebar.

By employment of shear damping, out-of-plane resonances of the beam structure are very effectively damped in a manner which does not alter the main structure of the support arm. This type of damping is most effective if the orientation of the layer of damping material is normal to the plane of the beam structure. Effectiveness is also increased if sidebars and layers of damping material are employed on both sides of the beam structure.

The preferred damping material is a layer of double sided adhesive tape, specifically a polyester backing membrane with an acrylic adhesive. This bonds to the sidebar and to the beam structure, thus providing a mechanical connection between them. Other materials have also been tried such as a simple layer of adhesive to bond the sidebar and arm directly together. However, this was less effective than the use of a strip comprising a membrane. The tape should be as thin as possible for the most effective consistent with the allowable operating stresses upon it.

It is preferable also that the sidebar and damping material should extend only along a portion of the length of the arm nearest to the head support end. This reduces the mass of the arm while preserving effective damping nearest to the point at which it is needed, i.e., the transducer heads. Extension of the slidebar and damping material along the whole length of the arm is relatively ineffective.

The material of the sidebar is preferably the same as that of the beam structure of the arm to minimize expansion problems. Aluminum has been successfully employed as the material for the beam and sidebar. However, a carbon fiber sidebar in conjunction with an aluminum beam structure was found to provide even more effective damping. The increased effectiveness is believed to be due to the greater stiffness of the carbon fiber.

The mechanical connection provided by the damping layer between the beam structure and sidebar need not be the only connection although it should be the major one if damping is to be effective. Thus any auxiliary connection should not prevent relative movement between the beam structure and sidebar.

BRIEF DESCRIPTION OF THE DRAWINGS

The invention will be described with reference to a preferred enbodiment as whown in the accompanying drawings, in which.

DETAILED DESCRIPTION OF THE PREFERRED EMBODIMENT

Figure 1:
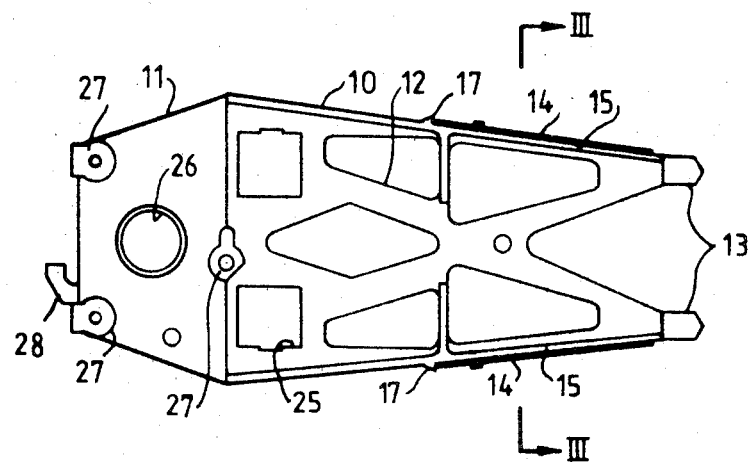
FIG. 1 is a plan view of a head support arm, according to the invention.
Figure 2:
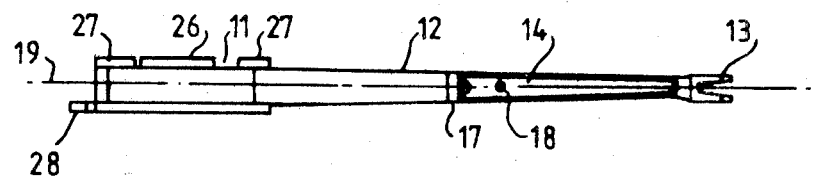
FIG. 2 is a side elevation of the arm of FIG. 1.
Figure 3:
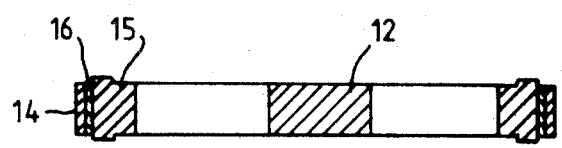
FIG. 3 is a cross-section (not to scale) of the arm of FIG. 1 taken on the line III—III.

As illustrated in FIGS. 1 to 3, the head arm assembly is formed from a flat aluminum beam structure 10. The structure consists of a thick parallel faced base portion 11 and a tapering extension framework 12, terminating in two bifurcated head supports 13. The other component of the support arm is a means for damping vibrations consisting of aluminum sidebars 14, each of which is bonded to a respective limb 15 of the extension framework 12 by a compliant layer of double sided adhesive tape 16. The sidebars are located on the limbs 15 by means of registration lugs 17 and are further retained in position by screws 18.

The screws 18 are located at the broader ends of sidebars 14 nearer to the base portion 11 of the arm. The narrower ends of the sidebars extend as far as possible towards head supports 13 and are mechanically connected to the limbs 15 only through the tapes 16, which consist of a polyester backing membrane having an acrylic based adhesive coating on both sides.

Provided that the sidebars are relatively rigid and do not have identical modes of vibration to the underlying portions of limbs 15, out-of-plane vibrations of arm 10 (the plane being indicated by dash line 19) cause relative motion between the sidebars 14 and the underlying portions of limbs 15 which produce shear stresses in the tape. Providing these stresses do not exceed allowable limits, the energy of the vibrations is absorbed by elastic deformation of the tape in shear. The effect is most marked if the damping layer is as thin as possible in relation to the sidebar and extension framework. In the arrangement of FIGS. 1 to 3, the tape employed was about 0.025 mm thick and the aluminum sidebar was about 1.0 mm thick. It should be noted that FIG. 3 is not to scale in this respect, for convenience of illustration.

Figure 5:
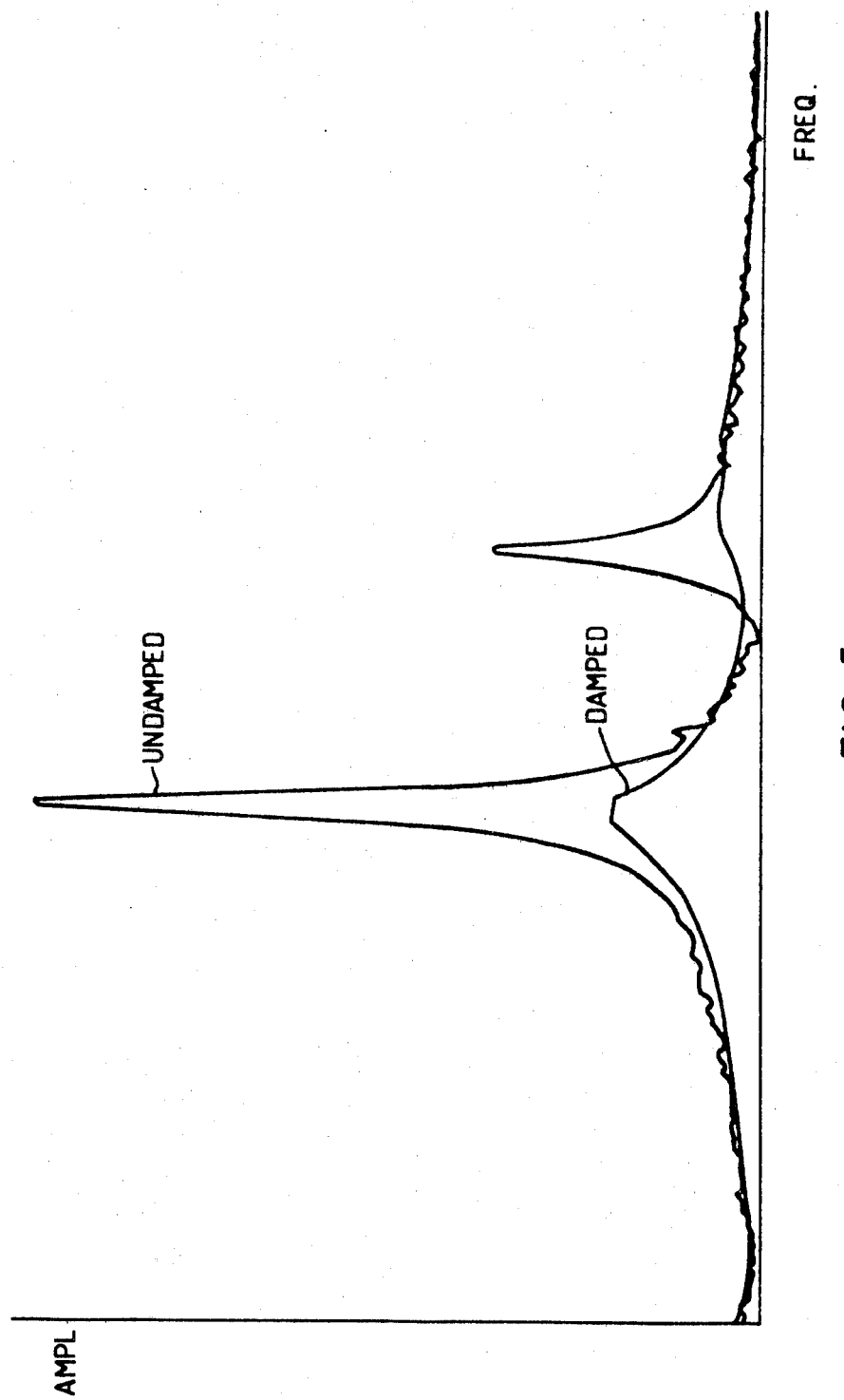
FIG. 5 shows the transfer function for out-of-plane vibrations of the damped head support arm of FIGS. 1 to 3 and the same function for the same arm without damping means.

FIG. 5 illustrates the transfer function for out-of-plane vibrations of an arm such as is illustrated in FIGS. 1 to 3 both with and without the damping means. The ordinate gives the amplitude of vibration and the abscissa its frequency. It can be seen that the major resonances of the arm are shifted slightly and damped by a factor of 5.

Figure 4:
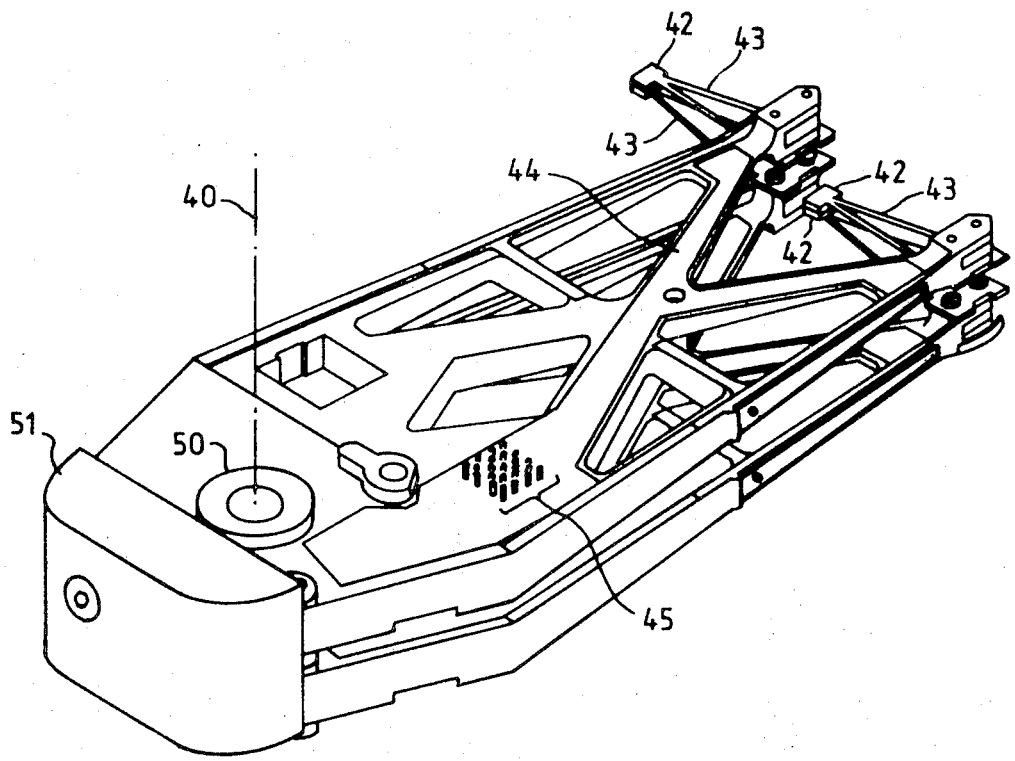
FIG. 4 shows a multiple head/arm assembly comprising two arms as shown in FIGS. 1 to 3 complete with transducing heads and suspensions.

The multiple head arm assembly shown in FIG. 4 includes two stacked head support arms, as illustrated in FIGS. 1 to 3, which are assembled as a unit together with other components, such as transducing heads, sliders and suspension. The assembled unit is intended to be mounted for rotation about an axis 40 on a rotary positioning apparatus (not shown), which may be a limited angle rotary actuator such as described and illustrated in European Patent Application No. 80106079.9.

Before the two arms are stacked together, pre-assemblies of a slider 42 including an electromagnetic transducing head (not shown) and a leaf spring suspension 43 are bolted to each of the head supports 13. The leaf springs are inclined out of the plane of their respective beam so as to urge their respective sliders 42 towards the surface of a magnetic disk (not shown) which will rotate within the gap between the upper and lower arms. The sliders and suspension springs are substantially identical to those shown in U.S. Pat. No. 4,167,765 (Watrous).

Electrical connection to the heads is provided by a flat tape cable 44 bonded to the diagonal cross-members of the extension framework 12 of each arm. The tape cable connects the heads to a circuit module located in a recess 25 of the arm. Connection pins 45 from the module are illustrated in FIG. 4. Two individual head arm assemblies are assembled to form the multiple assembly of FIG. 4.

The base portions 11 of each of the two support arms are each provided with a large bore 26 (FIG. 2) by means of which they are located on a cylindrical mandrel 50 that defines a common axis of rotation. The arms are angularly aligned about the mandrel and then clamped together by a bolt from beneath (not visible) which engages the mandrel. A counterweight 51 is then bolted to the pair of arms to complete the multiple head arm assembly and balance it about axis 40.

The multiple head arm assembly is bolted to a spindle extension of the rotary positioning apparatus by way of three bores 27. Prior to being bolted on the positioning apparatus, it is located accurately thereon by guide surfaces including the lug 28 of the lower of the pair of stacked arms.

It is apparent that out-of-plane movements of the head support arm, particularly at the head supports 13, will cause translational (in plane) movement of the sliders 42 and heads because of the flexure of the leaf springs 43. This movement of the sliders moves the heads off track and produces a position error signal to the closed loop servo system which controls head position. Should the head support arm have an out-of-plane resonance frequency which overlaps the bandwidth of the servo system, it is possible that, at this frequency, the gain of the servo loop will exceed unity and the system will become unstable. This is prevented by the damping technique described above.

I claim:

1. A head support arm for a disk file adapted to support a transducing head at one end and adapted at the other end to be mounted on a positioning apparatus in cantilever fashion, the arm comprising a relatively rigid beam structure of flattened cross section defining a plane therethrough, which structure is susceptible to out-of-plane resonances, and damping means to damp said resonances, characterized in that said damping means comprises a relatively rigid sidebar means located alongside one longitudinally extending edge of the beam structure, and a layer of relatively compliant damping material providing a mechanical connection between the sidebar means and the beam structure whereby out-of-plane resonances of the beam structure are damped by shear of the damping material as a result of relative motion between the beam and sidebar means.

2. A head support arm as in claim 1, in which said damping means extends along a portion only of the length of the beam structure adjacent the head support end of the arm.

3. A head support arm as in claim 1, in which said damping means comprises two sidebars and respective layers of damping material located on opposite sides of the beam structure.

4. A head support arm as in claim 1, in which said layer of damping material in normal to the plane of the beam structure.

5. A head support arm as in claim 1, in which said layer of damping material is thin in comparison with the sidebar.

6. A head support arm as in claim 5, in which said layer of damping material comprises a strip of double sided adhesive tape.

7. A head support arm as in claim 6, in which the double sided adhesive tape consists of a polyester backing membrane and the adhesive is an acrylic material.

8. A head support arm as in claim 1, in which both the beam structure and said sidebar means are made of aluminum.

* * * * *